United States Patent Office 3,256,558
Patented June 21, 1966

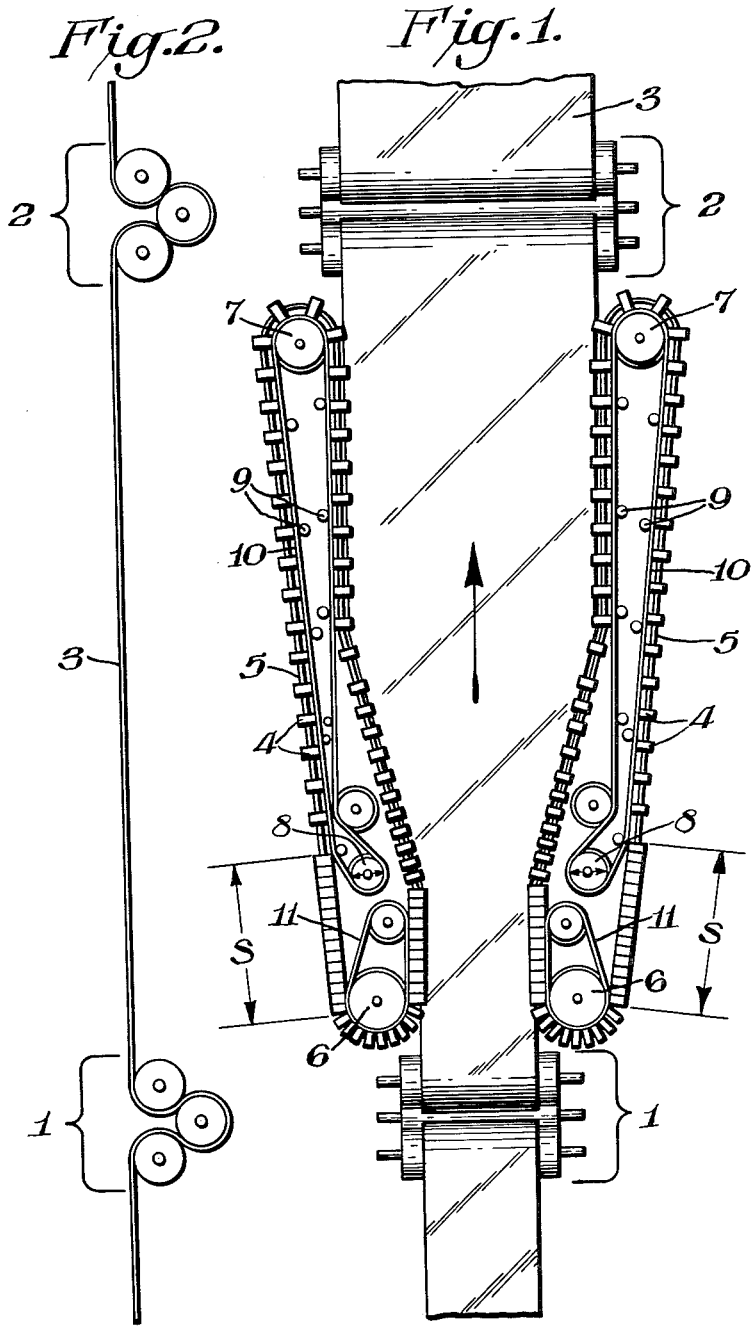

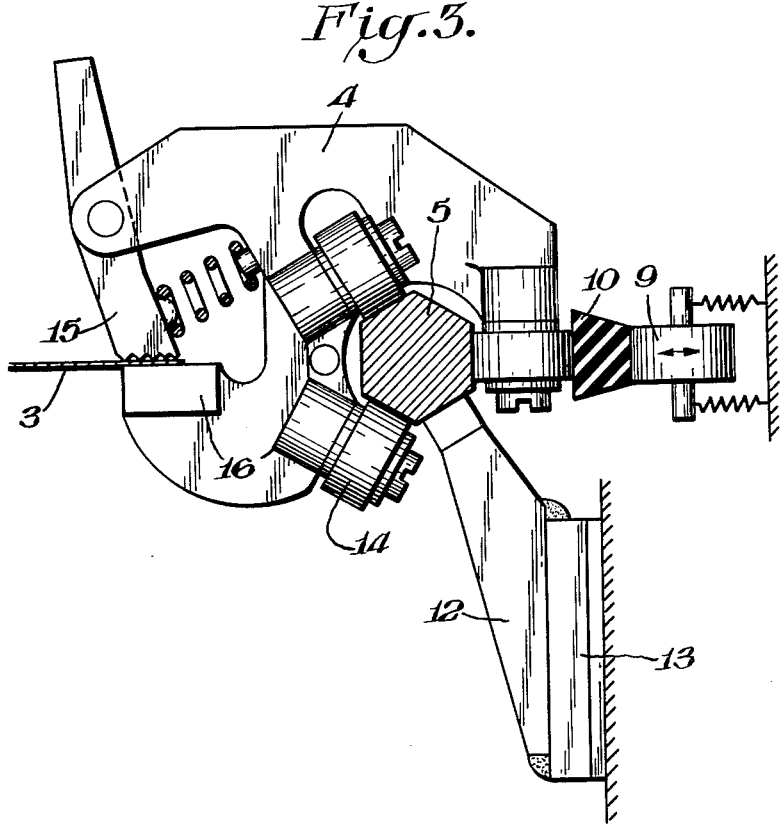

3,256,558
APPARATUS FOR CONTINUOUSLY DRAWING SHEETINGS SIMULTANEOUSLY IN A LONGITUDINAL AND A TRANSVERSE DIRECTION
Heinz-Erhardt Andersen and Dieter Koch, Burgkirchen, Upper Bavaria, Germany, assignors to Farbwerke Hoechst Aktiengesellschaft vormals Meister Lucius & Brüning, Frankfurt am Main, Germany
Filed Aug. 18, 1964, Ser. No. 390,326
Claims priority, application Germany, Aug. 21, 1963, F 40,549
4 Claims. (Cl. 18—1)

The present invention relates to an apparatus for continuously drawing sheetings simultaneously in a longitudinal and a transverse direction.

The present invention relates to an improvement of the known continuous drawing in a longtudinal direction and simultaneously in a transverse direction of heated endless sheetings of thermoplastic materials such as polyvinyl chloride, polystyrene, polyacrylic acid esters, polyolefins, polyamides and the corresponding known copolymers, by means of roller systems and vice clamps which circulate on endless guide bars and are moved in the drawing zone by the tension of the moving sheeting and outside this zone by elastic conveying means.

Accordingly to this method of drawing sheetings simultaneously in a longitudinal and a transverse direction, the clamps seizing the edge of the sheeting move on diverging rails during the drawing process and the distance between the individual clamps must be increased continuously. The clamps must not therefore be interconnected rigidly as in the usual transverse drawing frames. To continuously increase the distances between the individual clamps in the drawing zone, various apparatuses have been used in the case of which the desired effect is automatically produced by mechanical systems. Apparatus has been proposed in which the clamps are interconnected in an articulated manner by rods of the kind of lazy tongs, the middle or outer points of rotation of which are conducted in a further rail which nears the path of the clamps proper in the drawing zone according to the drawing ratio so that the lazy tongs are expanded whereby the distances between the clamps are increased. There has also been proposed an apparatus in which loose clamps are seized in the drawing zone by a screw spindle with progressive pitch, thus increasing the distances between the clamps in a desired manner.

The above apparatuses have the disadvantage that, owing to the forced mechanical guidance of the clamps, they cannot be operated in a reliable manner at the speeds at which the sheetings must travel to render the production economical so that a non-simultaneous drawing in a longitudinal and a transverse direction is more economical in spite of the high expenditure it requires.

To simplify the mechanical system for moving the clamps in the simultaneous biaxial drawing, it has already been proposed to use a vertically arranged drawing frame through which the sheeting is passed in an upward direction, the loose clamps being drawn upwards by the sheeting and being then returned by their dead weight to the entrance to the drawing zone. However, this method cannot be used in practice, since particularly in the case of relatively thin sheetings less than 200μ thick, the tensile strength of the heated sheeting in the drawing zone is too small to bear the weight of the clamps.

The present invention provides an apparatus for the simultaneous biaxial drawing of sheetings of thermoplastic material which avoids the disadvantages of the above apparatuses. The apparatus in accordance with the invention consists of a combination of two roller systems running at differents speeds and a system of vice clamps which are conveyed in the heated drawing zone by the sheeting. The apparatus in accordance with the invention comprises profile bars which can be shifted laterally and clamps which circulate freely on the profile bars with the help of roller bearings and are driven by endless V-belts outside the drawing zone. The V-belts are disposed in a manner such that they slide over the outer clamp rollers so that they can move at double the clamp speed owing to the rolling of the rollers against the profile bar.

Advantageously the cross-section of the profile bar has the shape of an equilateral regular hexagon and the clamps are provided with three pairs of rollers staggered by 120° which guide the clamp on the hexagonal bar.

In a preferred mode of construction the roller systems at the entrance to, and the end of the drawing zone consist each of three heatable rollers of identical diameter of which two are about a roller radius apart from one another and are driven at the same circumferential speed in the same direction, whereas the third roller runs loosely while resting on the first two rollers, and both trio roller systems prevent the sheeting from slipping when it is conducted between them while being wrapped around the loose rollers.

In another form of construction of the apparatus of the invention, the whole drawing frame is designed so as to be swingable in an infinitely variable manner about a horizontal axis so that the inclination of the plane in which the clamps circulate can be changed and the weight of the clamps with which the sheeting is charged can be adjusted to the requirements in a given case.

An apparatus for continuously drawing sheetings simultaneously in a longitudinal and a transverse direction constructed in accordance with the invention will now be described in more detail by way of example with reference to the accompanying drawings of which:

FIG. 1 is a plan view of the apparatus constructed in accordance with the invention, FIG. 2 is a side elevation of the trio rollers with the sheeting conducted between them, FIG. 3 is a sectional elevation of the profile bar with the clamp.

FIG. 1 shows a combination aggregate of feed and drawing rollers with vice clamps. The feed and drawing system comprises trio rollers 1 and trio rollers 2 which run at a higher speed than trio rollers 1, the sheeting 3 which travels via these trio rollers being drawn between them in a longitudinal direction. The clamp system for drawing the sheeting in a transverse direction is disposed in the space between trio rollers 1 and two rollers 2. It consists of two groups of clamps 4 which are disposed along both edges of the sheeting, each group of clamps being freely slideable on an endless profile bar 5.

The endless profile bars 5 are constructed in a manner such that they run parallel to the edges of the still undrawn sheeting in the feed zone, turn outward at small angle at the beginning of the drawing zone and run again parallel to the edges of the biaxially drawn sheeting at the end of the drawing zone. Profile bars 5 then draw away from the edges of the sheeting and turn outward in a short return bend and subsequently run in a substantially straight line to another return bend at the beginning of the feed zone. In the sections in which profile bars 5 run at an angle to one another, clamps 4 are moved on the profile bars by the sheeting seized by the clamps. In the other sections of profile bars 5, clamps 4 are conveyed by two endless V-belts 10 and 11 running over driven V-belt pulleys 6 and 7, guide pulleys 8 and pressure rolls 9 which press the V-belts elastically against the rollers of clamps 4 to such an extent that the latter are entrained by the V-belts by friction and are thereby shifted on profile bars 5.

FIG. 2 is a side elevation of trio rollers 1 and 2 with sheeting 3 conducted between them. Sheeting 3 is wrapped around the loose middle roller of each trio arrangement so that it is clamped by its own tension between the loose roller and the two lower rollers in a manner such that it cannot slip through between the roller systems.

Guide pulleys 8 for V-belt 10 may be swung away from profile bar 5 in the direction of the arrow. In this manner, section S of profile bar 5 which serves for storing the clamps, may be extended or reduced to a certain extent to adjust it to the number of clamps to be stored which number varies with the desired proportion of longitudinal drawing.

FIG. 3 is a sectional elevation of profile bar 5 and clamp 4 showing a particularly advantageous mode of construction which ensures a smooth and uniform motion of the clamps with minimum friction. Endless profile bar 5 here has the shape of a regular hexagon. It is secured to supporting frame 13 by supports 12. Clamp 4 is provided with six roller bearings 14 serving as rollers which, arranged in pairs staggered by 120°, run on the hexagonal surfaces of profile bar 5.

The clamps are provided in known manner with clamp hammer 15 and clamp table or outer support 16. The upper lever arm of clamp hammer 15 cooperates in known manner with guard rails or plates (not shown) near the upper and lower reversal points of profile bars 5 to cause the clamps automatically to seize the edge of the sheeting at the beginning of the feed zone and automatically to open and release the sheeting at the end of the drawing zone. To ensure a ready motion of the clamps on the profile bar, it is essential that the center plane of the outer pair of rollers coincide with the plane of the sheeting to prevent a tilting moment about the profile bar from being imparted to the clamp by the tension of the sheeting.

The apparatus constructed in accordance with the invention has the advantage that in the drawing zone where the heated sheeting entrains the clamps when it moves forward, the sheeting is safely prevented from being torn near the places where the clamps engage. Canting and jamming of the clamps on their way on the profile bar and production of a tilting moment in the clamps with respect to the bar are also safely prevented.

When in practice sheetings are drawn in a longitudinal and simultaneously in a transverse direction with the help of clamps running freely on guide bars, the angle at which the profile bars carrying the clamps are arranged with respect to the longitudinal axis of the sheeting in the drawing zone is of great importance. If this angle is too small, the number of clamps required in the drawing zone for a determined ratio of transverse drawing is too large so that the total weight of the clamps which have to be entrained by the sheeting plus the friction between clamps and profile bar may be greater than the tensile strength of the sheeting. On the other hand, if the angle of attack of the bars in the drawing zone is too large, a self-locking and braking of the clamps may occur, which may exceed the tensile strength of the sheeting so that the latter may be torn. The optimum angle of attack of the profile bars depends substantially on the tensile strength, elongation, width and thickness of the sheeting, on its thermal capacity, the ratio between longitudinal and transverse drawing, the clamp weight and the friction factor between clamp and bar. When these factors are known the optimum angle can be estimated in a given case. If, for example, it is intended to draw a rigid sheeting of polyvinyl chloride $50\mu$ thick and 50 cm. wide at a temperature of 100° C. in a longitudinal and a transverse direction by factor 2, the optimum angle of attack of the profile bars in the drawing zone amounts to 13 angular degrees with a clamp weight of 500 grams and a factor of friction between clamp and bar of 0.1. For other types of sheetings of other dimensions and with other drawing ratios other optimum angles are obtained. That suggests rendering the two endless profile bars variable in some way or other so that their angles of attack in the drawing zone may be varied. This involves, however, great mechanical difficulties since varying points of discontinuity at the two profile bars in the drawing zone cannot be avoided in this case. These points of discontinuity would cause the clamps to move jerkily and would lead to a discontinuity of the drawing process. The present invention does not, therefore, provide for a variable course of the profile bars. Instead, the whole drawing frame consisting of two unalterable endless profile bars is designed so as to be swingable about a horizontal axis which is transverse to the direction in which the sheeting moves. This enables the drawing frame to be swung in an infinitely variable manner out of the horizontal plane, whereby the weight component of the clamps acting on the sheeting in the drawing zone can be varied.

By this swinging operation, the friction factor is also varied since the friction between clamp and bar is the smaller the more acceleration due to gravity assists in the shifting of the clamps on the bar as the drawing frame is more and more swung towards the vertical.

To obtain different drawing ratios and adjust the apparatus to sheetings of varying widths, the two endless profile bars are advantageously disposed in the aggregate in a manner such that they can be brought closer together or removed from one another in a direction transverse to the longitudinal axis of the sheeting, without the angle of attack being changed.

We claim:
1. An apparatus for continuously drawing heated sheetings of thermoplastic material simultaneously in a longitudinal and a transverse direction by means of a combination of two rollers systems running at different speeds and a vice clamp system, the clamps being conveyed in the drawing zone by the sheeting, which comprises two endless profile bars which enclose between them a narrow passage for the sheeting, the boundaries of this passage being parallel to the direction in which the sheeting moves, a trapezoidally enlarged passage for the sheeting which follows the first-mentioned passage and is, in turn, followed by a wider passage for the sheeting of which the boundaries are parallel to the direction in which the sheeting moves, vice clamps having rollers which circulate on the profile bars and which are driven outside the trapezoidal passage by endless V-belts which are disposed so as to slide over the clamp rollers so that they can move at double the clamp speed owing to the travel of the rollers against the profile bar, and a clamp storage zone on said profile bars adjacent said narrow passage in which zone circulating clamps are accumulated during operation, said clamps in said storage zone being out of drive contact with said belts.

2. The apparatus of claim 1 wherein the cross-section of the profile bars has the shape of an equilateral regular hexagon and the clamps are conducted on the profile bars with the help of three pairs of rollers staggered by 120°.

3. The apparatus of claim 1 wherein the roller systems at the entrance to and the outlet from the drawing zone consist each of three heatable rollers of identical diameter, the axes of which are disposed at the corners of an equilateral triangle and of which two are driven at the same speed and turn in the same direction while the third upper roller rests loosely on the other two rollers and follows their movement in a manner such that the sheeting to be drawn can be introduced into and withdrawn from the apparatus while being wrapped around the loose rollers.

4. The apparatus of claim 1 wherein a first pair of endless V belts bracket the wider passage for the sheeting and a second pair of endless belts bracket the narrow passage for the sheeting.

References Cited by the Examiner

UNITED STATES PATENTS

| | | |
|---|---|---|
| 2,755,533 | 7/1956 | Miller. |
| 2,796,930 | 6/1957 | Bennett _____ 226—195 X |
| 2,875,624 | 3/1959 | Lathrop _____ 226—171 X |
| 3,172,151 | 3/1965 | Glossmann. |

M. HENSON WOOD, JR., *Primary Examiner.*

ROBERT B. REEVES, *Examiner.*

J. N. ERLICH, *Assistant Examiner.*